United States Patent [19]
Woltjen

[11] 3,870,142
[45] Mar. 11, 1975

[54] FLEXIBLE BELT CARRIER MECHANISM
[75] Inventor: Duane W. Woltjen, Manchester, Mo.
[73] Assignee: UMC Industries, Inc., St. Louis, Mo.
[22] Filed: Feb. 20, 1974
[21] Appl. No.: 444,060

Related U.S. Application Data
[63] Continuation-in-part of Ser. No. 286,141, Sept. 5, 1972, which is a continuation of Ser. No. 884,511, Dec. 12, 1969, abandoned.

[52] U.S. Cl. ................ 198/193, 198/195, 198/199
[51] Int. Cl. ............................................ B65g 15/30
[58] Field of Search ................... 198/189, 193–195, 198/198, 199

[56] References Cited
UNITED STATES PATENTS
| 1,482,282 | 1/1924 | Adams | 198/193 |
| 2,646,161 | 7/1953 | Lorig | 198/193 |
| 2,930,478 | 3/1960 | Ruffino | 198/193 |
| 3,520,398 | 7/1970 | Thomson | 198/19 |

Primary Examiner—Evon C. Blunk
Assistant Examiner—Joseph E. Valenza
Attorney, Agent, or Firm—Paul M. Denk

[57] ABSTRACT

Rigid connectors between adjacent portions of flexible belt elements are fastened thereto in such a manner that when the belt flexes as it moves over supporting drums bending stresses are avoided at the fastenings. The flexible belt may be of segmental or continuous form, in the latter instance having a single connector at its two ends. The connectors may be in the form of carrier plates employed to carry pieces to be worked upon during movements of the connectors, or the connectors may be of a form of carry means to push unattached objects. In either case, movements may be continuous or intermittent. In cases in which the connectors are massive or carry massive parts, means are provided to prevent inertial oscillations during changes from translatory to angular movements of the connectors.

16 Claims, 23 Drawing Figures

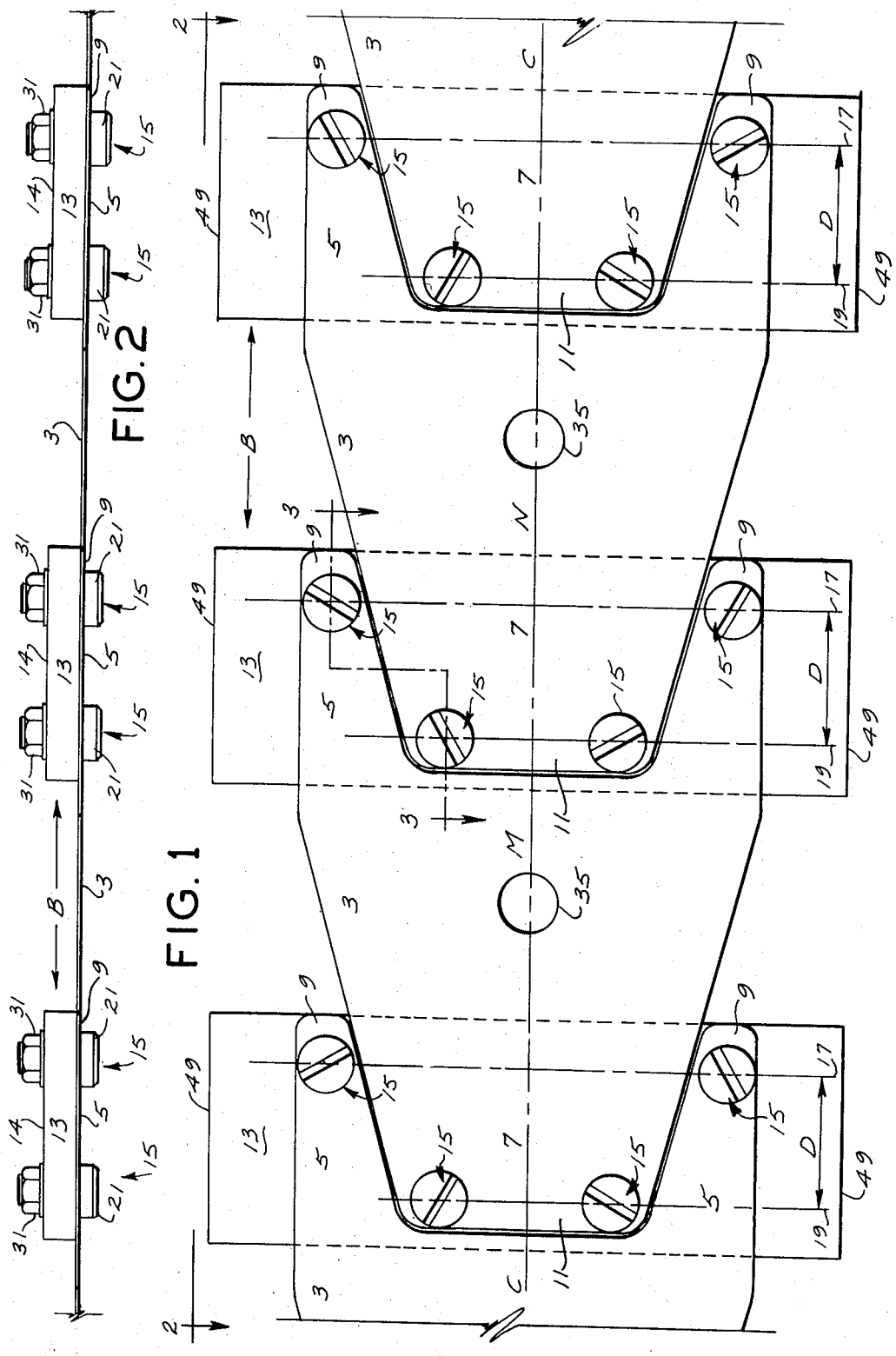

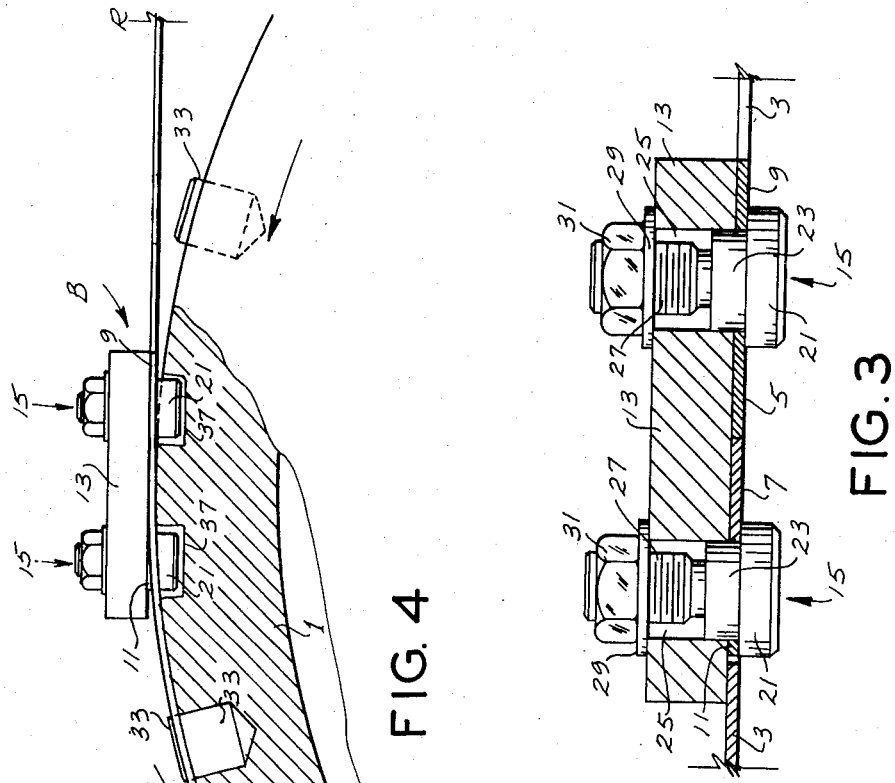
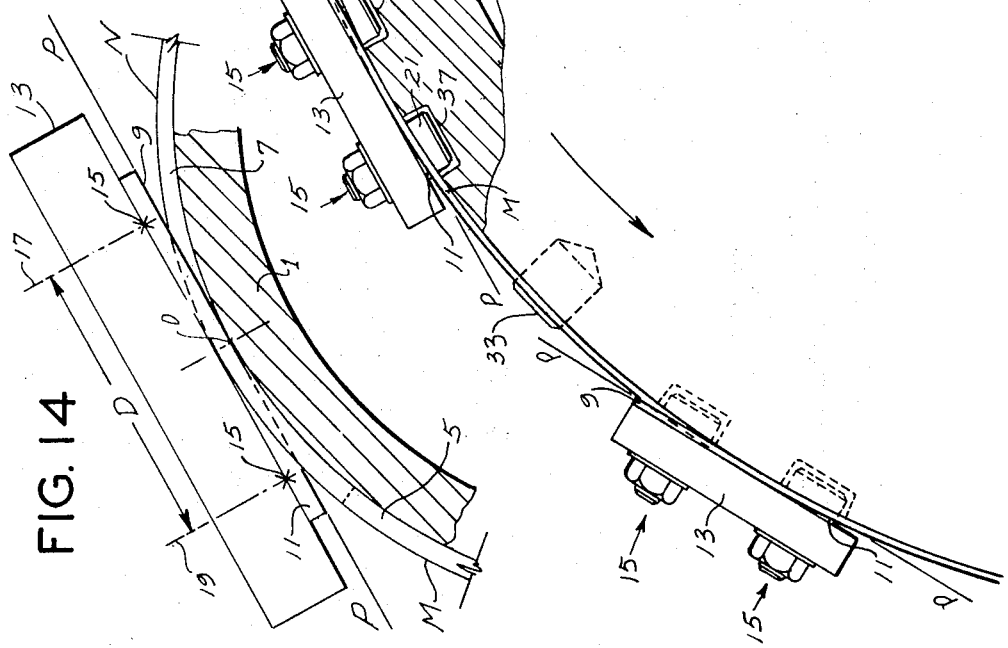

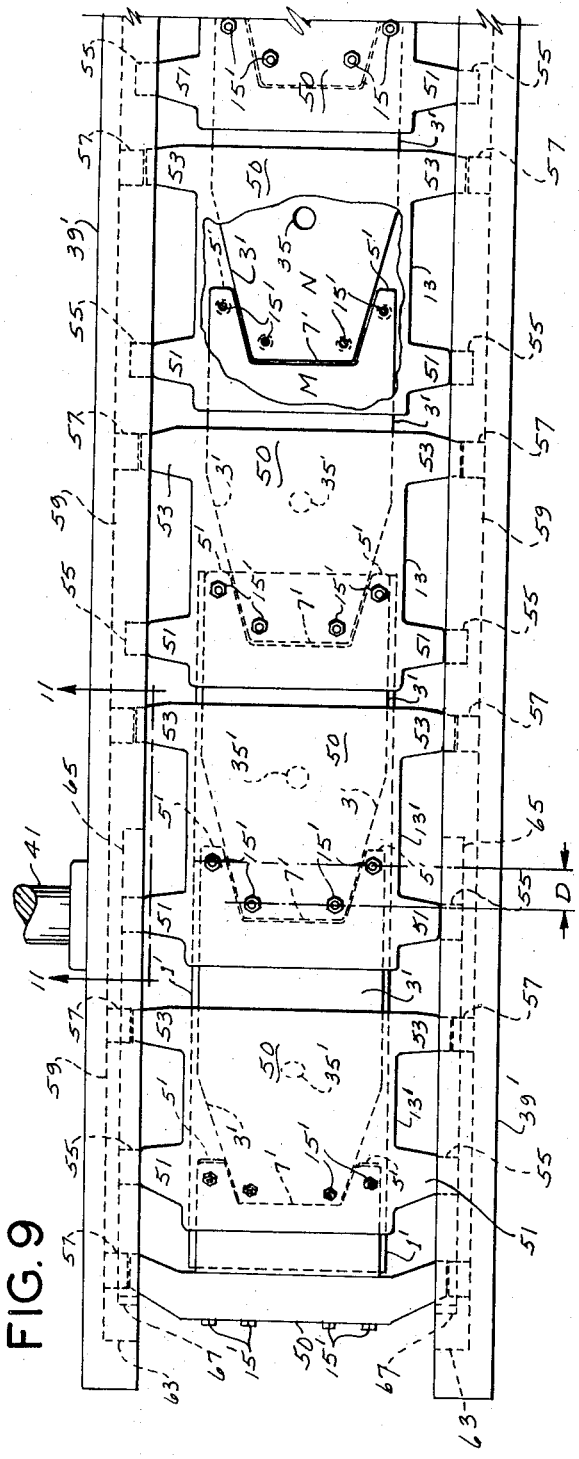

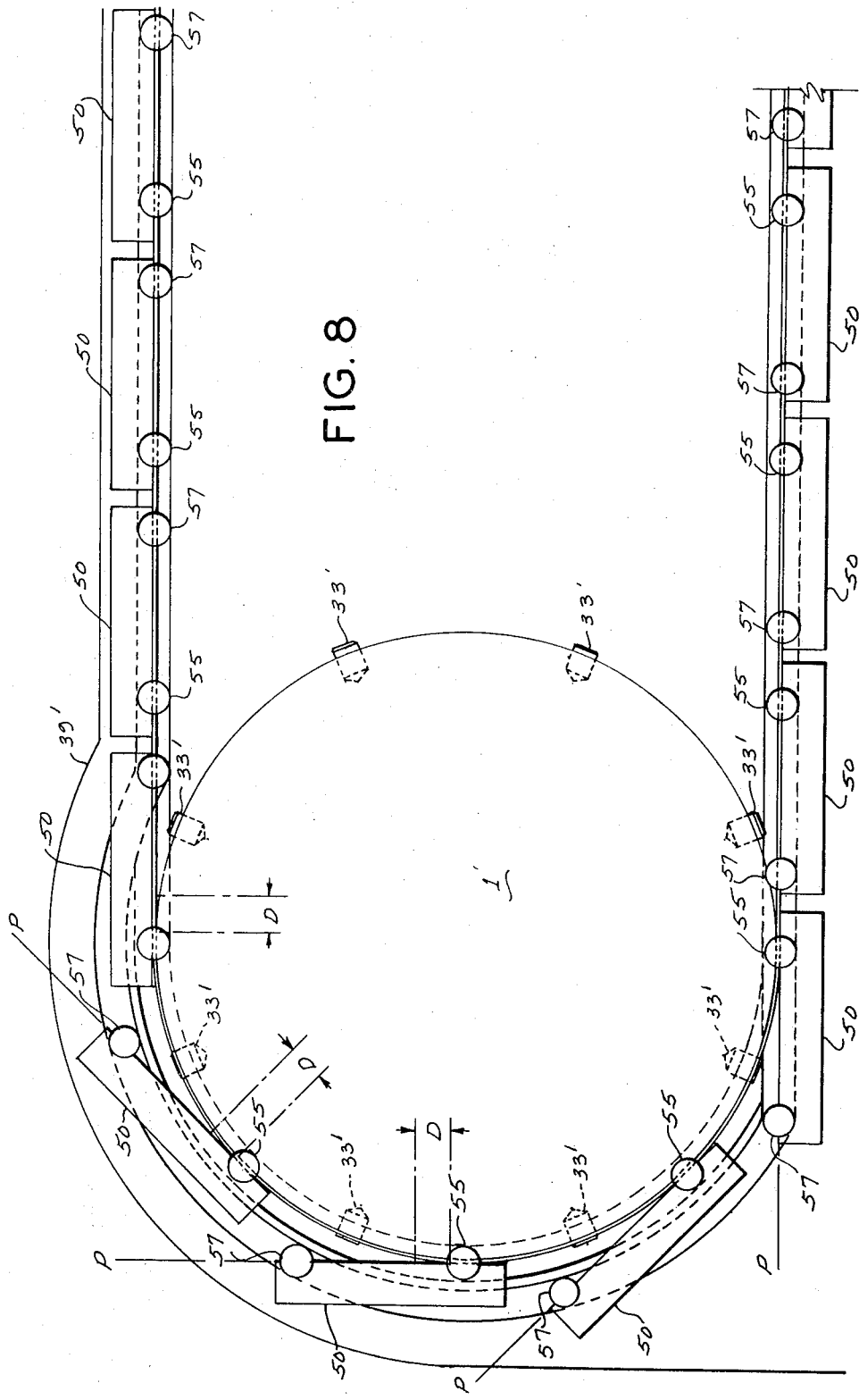

FLEXIBLE BELT CARRIER MECHANISM

CROSS REFERENCE TO RELATED APPLICATIONS

The subject matter of this application comprises a continuation-in-part of my application having Ser. No. 286,141, filed on Sept. 5, 1972, and this latter application comprises a continuation of my application having Ser. No. 884,511, filed on Dec. 12, 1969, this present application claiming priority with respect to all common subject matter contained in these earlier applications, with all of said applications being owned by a common assignee.

BACKGROUND OF THE INVENTION

It has been known to mount carrier plates on endless flexible flat belts, the latter being supported on and moved by drums (see for example U.S. Pat. No. 3,379,298). The manner in which the plates have heretofore been fastened to such a belt, particularly when the latter was composed of metal was not entirely satisfactory, because of high bending stresses generated at fastenings when the belt was flexed, as during movement over a supporting drum. This shortened operating life of the belt. In some such devices, undesirable oscillations of the connectors may occur in approach and recessive movements to and from a drum, particularly when the plates are heavy or carry heavy workpieces. These oscillations if considerable should be avoided.

SUMMARY

The invention eliminates the difficulties above referred to by forming adjacent portions of a flexible belt to include extensions in the direction of the belt length, lying transversely with one another, and which also lap one another in the direction of said belt length in the plane of the belt so that when the belt is flat the outer ends of the lapped extensions are spaced in the direction of the belt length. The rigid member to be supported is then fastened to such outer ends of the extensions to span the space between the same. Thus the fastening means between the extensions and the rigid member are caused always to lie in a plane, regardless of whether the connector at a particular time is located in a flat reach of the belt between drums, or in a curved portion of the belt on a drum. When the fastenings are between parts which remain coplanar, rather than one part being bent away from the other at the point of fastenings, any bending stresses at the fastenings are avoided. Oscillations which may occur are also prevented. According to the invention the fastenings between the work-carrying connectors and flexible portions may be made quite tight for high positional accuracy of the workpieces which they carry; whereas heretofore if bending stresses at the fastenings were to be avoided, looseness at the fastenings was called for, with resulting low positional accuracy.

BRIEF DESCRIPTION OF THE DRAWINGS

FIG. 1 is a face view of a first form of a belt made according to the invention.

FIG. 2 is an edge view sighted across line 2—2 on FIG. 1;

FIG. 3 is an enlarged cross section taken on line 3—3 of FIG. 1 showing details of certain fasteners;

FIG. 4 is a view, partly in elevation and partly in section, illustrating improved action of the belt of FIGS. 1 and 2 when supported on a drum;

FIG. 6 is a fragmentary plan view of FIG. 5;

FIGS. 8, 9 and 10 are fragmentary side, plan and end views corresponding to the views in FIGS. 5, 6 and 7, respectively, but illustrating another form of the invention, parts being broken away;

FIG. 14 is a skeleton diagram illustrating certain of the basic features of the invention;

Corresponding reference characters indicate corresponding parts throughout the several views of the drawings.

DESCRIPTION OF THE PREFERRED EMBODIMENTS OF THE INVENTION

Figure 5:
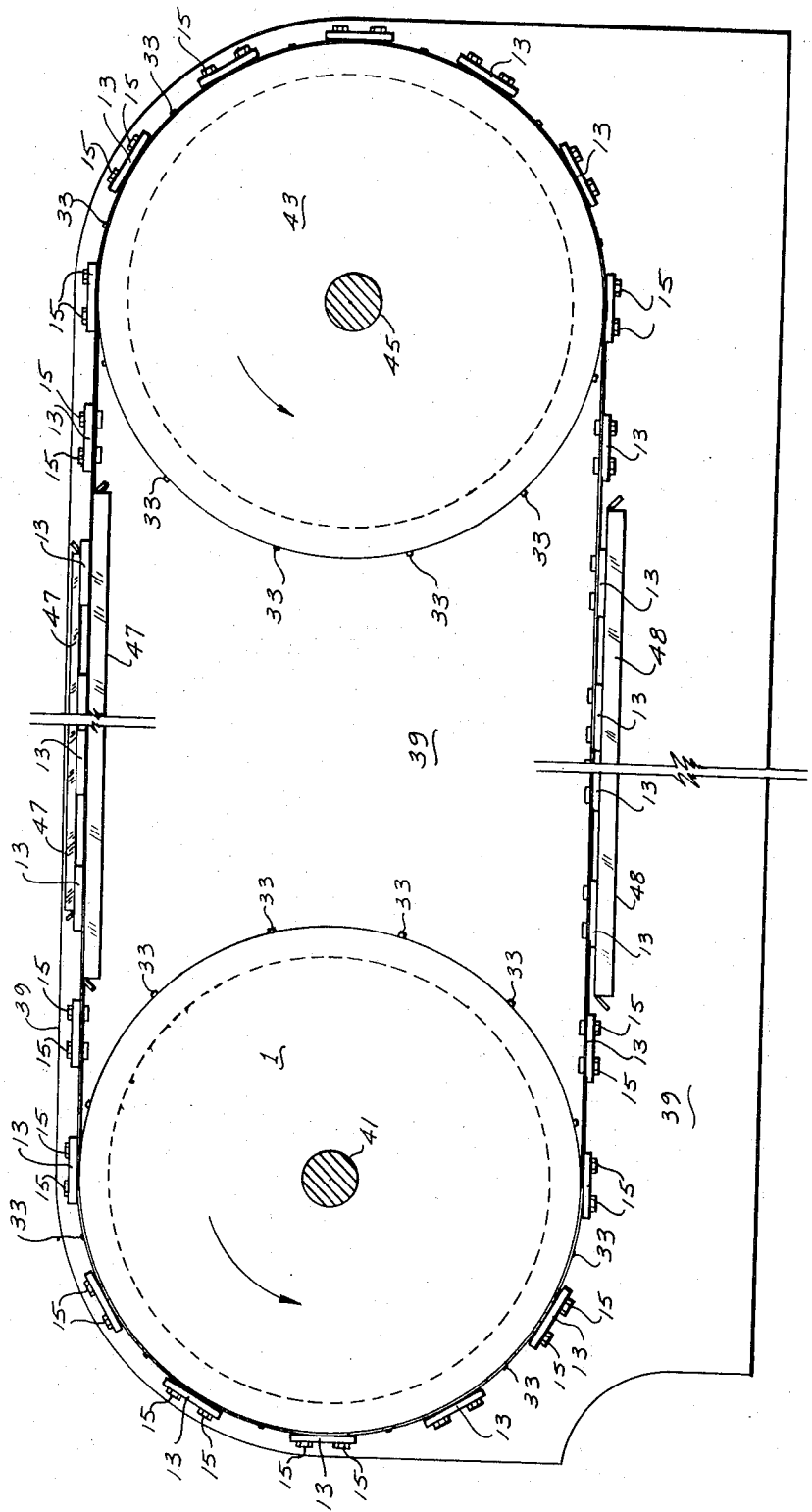
FIG. 5 is a side view of a mechanism employing the belt of FIGS. 1-4.
Figure 10:
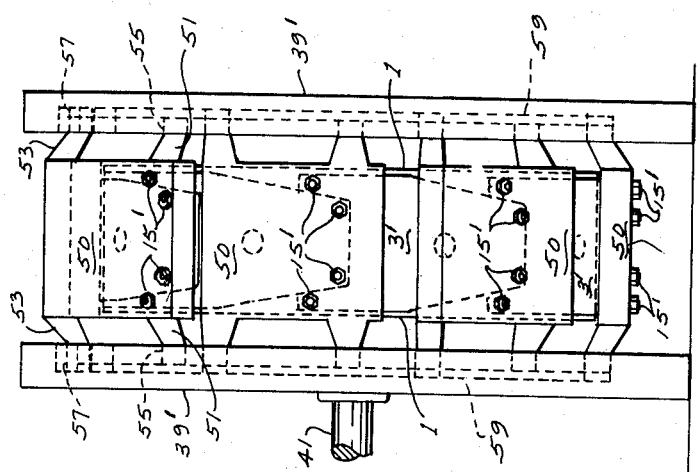

Hereinafter the term "connector" has the significance of a rigid part such as of metal which either carries workpieces or the like in order to carry them from place to place, or which may be formed or have attached thereto means for engaging external objects to move them. In the first and second forms of the invention (FIGS. 1-11) the connector forms the sole connection between adjacent end portions of adjacent links; in the third form of the invention (FIG. 12) the connector forms the sole connection between adjacent end portions of a continuous belt having two ends; in the fourth form of the invention (FIG. 13) the connector forms an auxiliary connection (not the sole connection) between adjacent portions of a continuous and endless belt; and in the remaining forms of the invention (FIGS. 15-23) various forms of portions of links are shown as having single or multiple extensions from their ends. Rigid connectors made according to the invention may take a wide variety of forms, depending upon particular applications. In all forms of the invention the belt material, aside from the connectors, is composed of thin flexible sheet material such as spring steel but may be made of other appropriate flexible sheet material.

Referring to the first form of the invention illustrated in FIGS. 1–7, numeral 1 indicates a drum, shown partially in section in FIG. 4, around which is carried a belt indicated generally by the letter B. This belt is made of thin flexible links 3, composed for example and without limitation of 0.016 inch (27 U.S. gage) cold-rolled SAE 1074 soft annealed spring steel stock. The thickness depends upon the mechanical strength required of a link in a given application but should not be so great as to interfere with the required flexibility for curved engagement with drum 1 by bending and return to a flat condition upon disengagement.

In this embodiment of the belt, opposite end portions of each link 3 form extensions such as fingers 5 at the right end and a tongue 7 at the left end. The links are paired in end-to-end relationships, such that the outer ends 9 of fingers 5 of one link interdigitate with the distal ends 11 of a tongue 7 of an adjacent link, the interdigitation being in the plane of the belt when flat. This interdigitation of the fingers 5 and the tongue 7 is such as to space apart their respective outer ends at least a distance D between lines 17 and 19 in the direction of the belt length. Lines 17 and 19 are perpendicular to the center line C—C of the belt B.

Numerals 13 indicate rigid connectors of rectangular form to the faces 14 of which (FIG. 2) workpieces, lugs or the like may be fastened by conventional means (not shown). These are to be moved either continuously or intermittently, as desired. Or, these connectors may in and of themselves be shaped on said faces 14 with projections for pushing along unconnected objects. In any event, each connector 13 is held to the outer ends 9 of a pair of fingers 5 of one link 3 by one pair of screw fasteners 15 on line 17. Connector 13 is also held to the outer end 11 of tongue 7 of an adjacent link 3 by another pair of like fasteners 15 on line 19. Thus the two pairs of fastenings 15 are spaced apart the distance D, and the fasteners 15 holding the end 11 to the connector are positioned where said fingers 5 lap said end, and they are spaced lengthwise beyond the region where the other fasteners 15 secure said connector to the fingers 5. In the embodiment shown, the outer ends of the fingers 5 and the tongue 7 are secured proximate the side edges of the connector.

Each fastener 15 is constituted by a shoulder-forming head 21 which seats upon what is to become the inside of a link 3 (FIG. 3). Cylindrical portions 23 closely fit into coaxial holes of equal diameters in the links 3 and in the connectors 13. The holes in connectors 13 are shown at 25. Extending from the cylindrical portions 23 are threaded shanks 27 for the acceptance of washers 29 and nuts 31. Thus it will be seen that by tightening nuts 31, rigid fastenings are accomplished between each connector 13 and an abutted pair of the links 3. It is such rigid fastenings that heretofore would have caused trouble when connectors moved over a drum thereby engendering high local bending stresses at the fastenings with shortened belt life. Former provision of play at the fasteners to relieve the stresses was not a satisfactory solution because of the resulting looseness of the connectors.

Referring to FIG. 4 it will be seen how bending stresses are avoided with tight fastenings 15. The drum 1 carries dowel pins 33 which are engageable with holes 35 formed through the links 3 in order to obtain a positive drive. The drum 1 is provided with recesses 37 for accepting the heads 21 of the fasteners 15. As the belt B approaches the drum, say from the right, as illustrated, the inside surfaces of the outer ends 9 and 11 of the fingers 5 and the tongue 7 respectively remain in the flat inside plane of the belt B along its straight reach P. The rigidity of the connectors 13 permanently holds the inside surfaces of the outer ends 9 and 11 in the same plane. This condition is maintained even after the connectors 13 take up positions around the drum 1 as illustrated at the left in FIG. 4. Thus the inside surfaces of said fastened outer ends are always coplanar and the plane is tangent to the drum surface (see planes P—P). Thus there is never any bent condition in any of the links 3 at a fastener 15 and hence there are no bending stresses at the points of attachment between the connectors 13 and said links 3. While tangency between planes P—P and the drum 1 is illustrated in FIG. 4 as bisecting the distance D, such bisection is not a necessary condition. In other words the connectors 13 and planes P—P may rock with respect to the drum surface so as to shift the points of tangency of planes P—P within the range D. However, a coplanar relationship between outer ends 9 and 11 of the fingers 5 and tongues 7 is maintained. Such rocking may occur under inertial vibration of heavy parts carried on the connectors 13 but is ordinarily not enough to make plane P—P tangent to the drum at or near either line 17 or 19.

Figure 7:
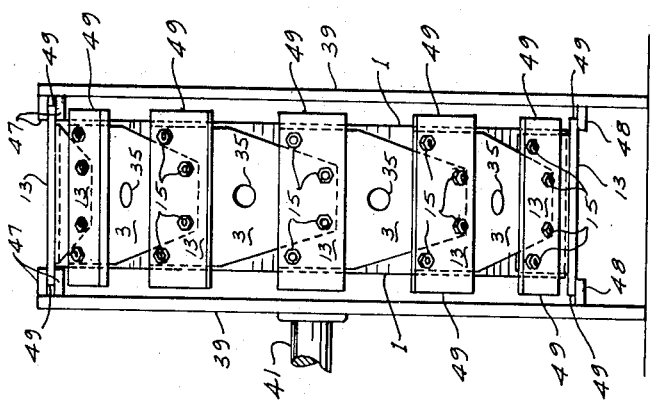
FIG. 7 is a left-end view of FIG. 5.
Figure 11:
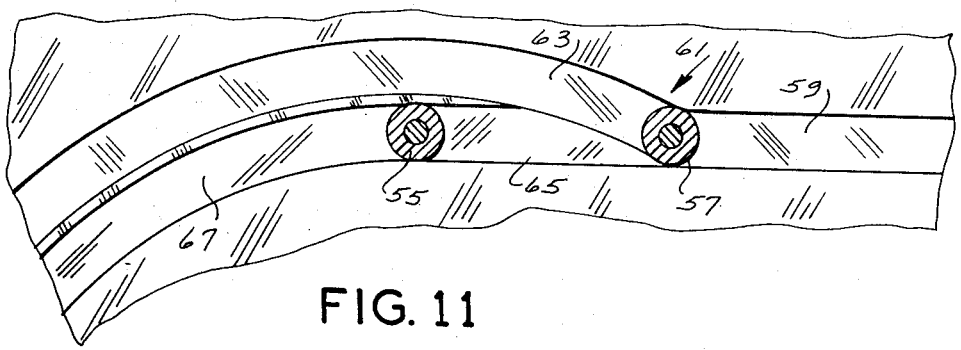
FIG. 11 is an enlarged detailed cross section taken on line II—II of FIG. 9.

FIGS. 5–7 illustrate apparatus employing the belt of FIGS. 1–4. This comprises side plates 39 for supporting the driving drum 1 on a drive shaft 41 and an idler drum 43 on a shaft 45. The drum 43 is constructed like the drum 1, except that it is not power driven. Its shaft 45 may be adjusted relative to shaft 1 by conventional means (not shown) for belt tensioning purposes. Drive means for the drive shaft 41 is not shown since various drives for the purposes are known, such as continuous drives, intermittent-motion drives, etc.

In order to prevent sag in the reaches of the belt between the drums 1 and 43, there are provided inwardly extending spaced upper tracks 47 above and below the upper reach and lower track 48 below the lower reach. Sidewise projections 49 of the connectors 13 travel between the upper tracks 47, being thus accurately held in one plane of movement in the upper reach. Likewise, the projections 49 riding on track 48 hold the belt in a plane in its lower reach.

Referring to FIGS. 8–11, these have been made fragmentary to provide for sufficient enlargement to show certain details. They illustrate modifications wherein primed index numbers indicate like-functioning parts to those indexed with corresponding unprimed numbers in FIGS. 1–7, although they may be of somewhat different shape, as hereinafter pointed out.

The modified structure comprises flexible links 3' having tongues 7' lapped with fingers 5' on adjacent links 3'. These links 3' include holes 35' engaged by dowel pins 33' on a driving drum 1' having drive shaft 41'. An idler drum corresponding to idler drum 43 in FIGS. 1–7 is not shown. In the modification (FIGS. 8–10) the connectors are indicated at 50. These connectors 50 are larger and more massive than the corresponding connectors 49 shown in FIGS. 5–7. This is for the purpose of receiving heavier workpieces, such as are responsible for the greater tendency of the connectors to oscillate as they transfer from straight-line motion to circular motion as a drum is approached or from circular to straight-line motion upon leaving a drum. Screw fasteners 15' (like 15 shown in FIG. 3) rigidly join each connector 50 with the outer ends of the lapped fingers 5' and tongue 7' of adjacent links 3'. Each connector 50 has a substantial dimension lengthwise of the belt to provide for laterally extending long and short leading and trailing extensions 51 and 53. Note in FIG. 9 that the connectors 50 overlie the links 3' so that the latter for the most part are represented by dotted lines except for portions exposed by breaking away part of one connector. Note also that the members of each group of fasteners 15' are located toward one end of a connector 50.

The short extensions 51 carry rollers 55 and the long extensions 53 carry rollers 57. Side plates corresponding to side plates 39 in FIGS. 5–7 are numbered 39' in FIGS. 8–10. In these are grooves 59 which are deep enough to accept the rollers 57 on the longer extensions 53 and also the rollers 55 on the shorter extensions 51. The deep grooves 59 are straight until they reach a point as shown at 61 in FIG. 11. Here each continues as an outer circular branch 63. A shallow branch of groove 59 continues as a straight portion 65 and then as an inner circular portion 67. Thus as the rollers 55 approach the drum they can and do continue on into the shallow inner circular branch groove 67; whereas the rollers 57, not being able to continue into the shallow groove part 65, are switched into the deep outer circular branch groove 63. The purpose of this arrangement is positively to hold the connectors 50 against oscillations from tangent positions relative to drum 1', as illustrated at P in FIG. 8.

It is to be noted that the fasteners 15' between the fingers 5' and the tongues 7' are offset with respect to the center portions of the connectors 50 which accounts for the apparently unsymmetrical positions assumed by the connectors 50 relative to drum 1' (FIG. 8). On the other hand, the absence of bending stresses at the fasteners 15' between connectors 50 and the distal ends of fingers 5' and 7' are the same as in the case of the corresponding parts 13, 5 and 7 of FIGS. 1–7. The difference is that on oscillations of connectors 50 can occur on the drum 1'. The distance D is shown on FIGS. 8–10.

In the operation of the FIGS. 8–11 form of the invention, the rollers 55 and 57 follow the deep groove 59 in the reaches of the belt between drums. This carries the links 3' in a plane until a drum such as 1' is reached. At this point rollers 55 continue into the inner circular groove 67 whereas the outer rollers 57 are switched into the outer circular groove 63. This holds the connectors 50 in the tangent positions P' shown in FIG. 8.

Figure 12:
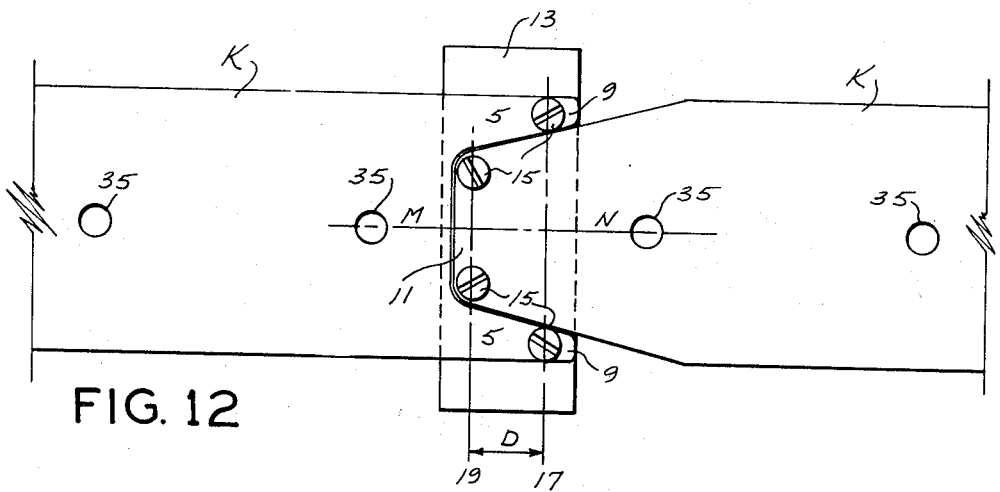
FIG. 12 is a view similar to FIG. 1 showing a third form of the invention.

Referring to FIG. 12, it shows a belt composed, not of a plurality of links as in FIGS. 1–7 or 8–11, but one in which the belt (lettered K) is made of one continuous strip of flexible material having adjacent ends formed like the adjacent ends of the links in said FIGS. 1–11. Thus in FIG. 12 these ends are joined by connectors 13 the same as in FIGS. 1–7 which are fastened by means of fasteners 15 to the outer ends 9 of fingers 5 at one end of the belt and to a distal end 11 of the tongue 7 at the other end of the belt K. The action on a drum of this arrangement is similar to that already described in connection with any one of the connectors 13 of FIGS. 1–7. The belt K has holes 35 in it corresponding to the holes 35 for registration with the dowel pins 33 on drum 1 of FIGS. 1–7. It it of course obvious that in any case such holes could be eliminated if the dowels 33 were eliminated from the drum 1 for nonpositive driving operations. In such cases peripheral grooves on the driving drum would be used to accommodate fastener heads such as 21.

Figure 13:
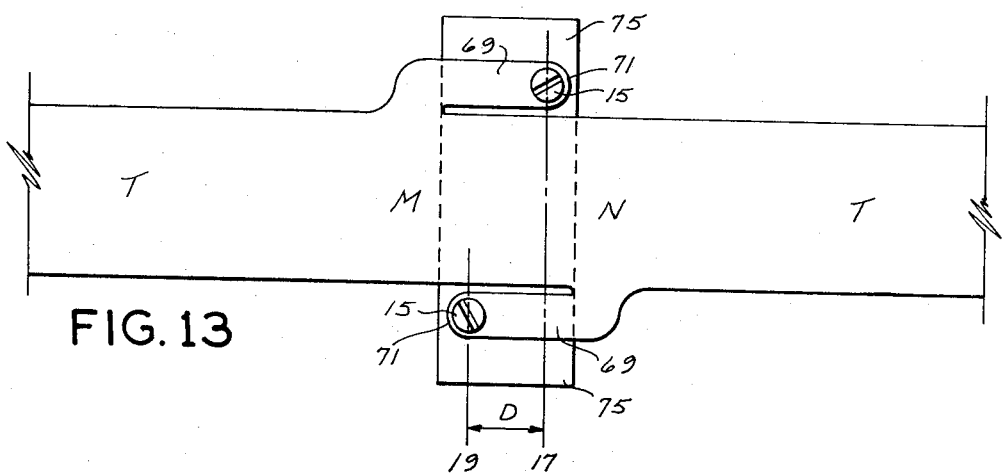
FIG. 13 is a view similar to FIG. 1 showing a fourth form of the invention.

In FIG. 13 is shown a form of the invention in which the flexible belt is of one piece and endless. It is lettered T. Extending from its opposite sides are L-shaped fingers 69 which extend oppositely and lap each other in a direction along the length of the belt and in its plane when flat. The outer ends 71 of these fingers are thus spaced from one another in a direction along the belt length. Fasteners 15, like those of FIG. 3, attach the outer ends 71 to an appropriate rigid connector 75. Thus as the portions of the belt under the connector 75 engage a circular drum, the outer ends 71 of the lapping fingers 69 lie in a common plane which is substantially tangent to the drum surface.

From the above it will be apparent that in each form of the invention (FIGS. 1, 9, 12 and 13) there are adjacent flexible sheet-like portions such as M and N in the belt which are joined by a rigid connector, these sheet-like portions being shaped with projections which lap in the plane of the belt when flat but can freely assume positions in another plane when the belt is fitted around a cylinder. In such other positions the projections are held in a plane substantially tangent to the cylinder by the rigid connector. The line of tangency may lie anywhere in the span D. In the FIG. 13 form the portions M and N are parts of one undivided sheet; whereas corresponding portions in the forms of FIGS. 1–12 are divided. In the forms of FIGS. 1–7, 12 and 13 the angular locus of the tangent plane may vary under any angular vibration of the connector; whereas in the FIGS. 8–11 form this is not the case, because the circular grooves 63 and 67 positively determine the angular locus of the connector and of the tangent plane.

Figure 18:
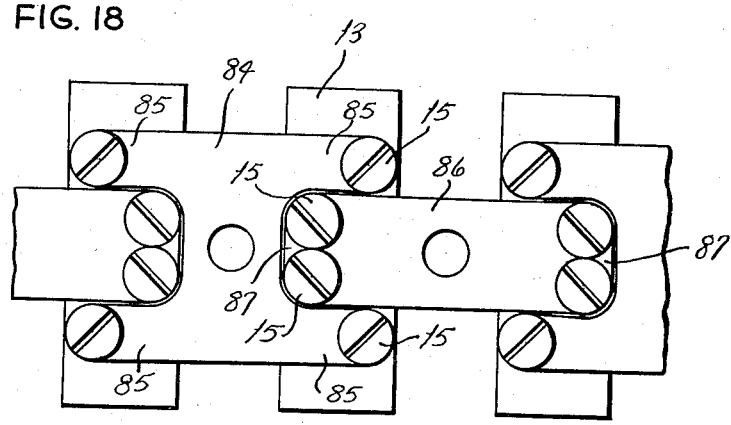
FIG. 18 is a view similar to FIG. 1 showing additional form of the invention.
Figure 19:
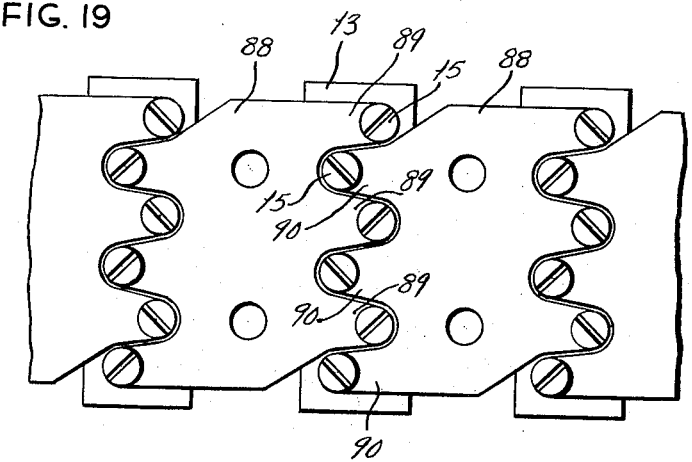
FIG. 19 is a view similar to FIG. 17 showing another form of that invention.
Figure 20:
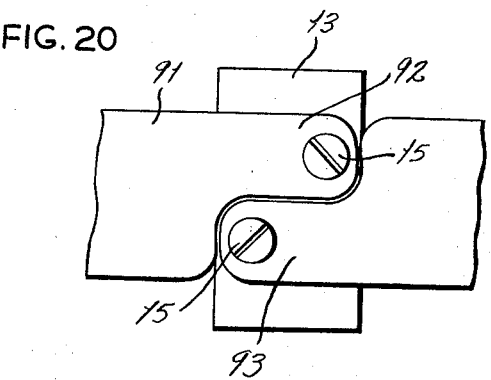
FIG. 20 is a view similar to FIG. 13 showing another form of that invention, wherein a single flexible portion is provided with an extension from each end for attachment to a connector.

Other various forms of flexible belt segments or portions are shown in FIGS. 15 through 23, and in most instances, these segments are shown as a series of adjacent links, with the exception of FIG. 20 wherein the lapping portions are shown as single extensions from the ends of one continuous strip of flexible material forming the belt. But, it is just as likely that any form of lapped extensions as shown in the various figures of the drawings of this invention can be formed as extending from individual links, or from the ends of one continuous strip forming a belt per se.

Figure 15:
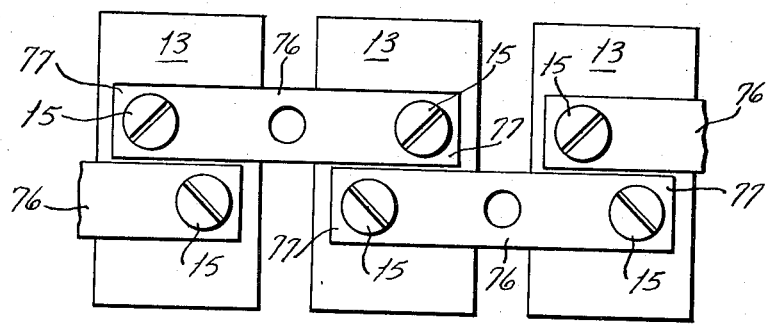
FIG. 15 is a view similar to FIG. 1 showing another form of the invention wherein single extensions from adjacent flexible portions attach to each connector.

FIG. 15 discloses a series of the connectors 13 having a plurality of links 76, formed as portions of a belt, attaching thereto through the agency of the fasteners 15. Each link 76 may be defined as formed having integral extensions, as at their end locations 77, each segment comprising a singular form of extension that is arranged in lapping relationship with a like extension formed from the next adjacent link 76. And, it is to be noted that the fasteners 15 attach the link end segments to a connector 13 at a position beyond where each link laps one another and attaches to said connector along the length dimension of the flexible belt. Hence, as the connectors 13 traverse around the particular drums of a carrier mechanism, as previously defined, each end segment 77 of a link in the vicinity of its attachment to a connector 13 by means of the fasteners 15 will be retained tangentially of the drums circumference and remain in a planar relationship with respect to the surface of the connector 13 to which it attaches.

Figure 16:
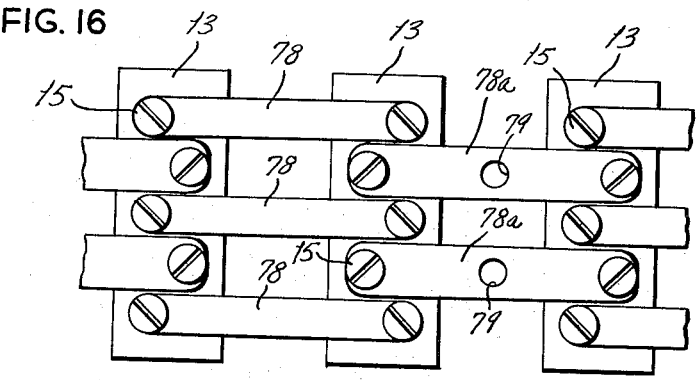
FIG. 16 is a view similar to FIG. 15 showing another form of the invention wherein single extensions from a plurality of adjacent flexible portions attach to each connector.

FIG. 16 is similar in design to the form of the invention shown in FIG. 15, with the exception that each link between adjacent connectors 13 comprises a plurality of flexible member 78, here shown as comprising a series of three such flexible portions 78 between one pair of connectors 13, with alternate and adjacent links 78a being pairs of such belt portions between the next adjacent connectors 13, the link arrangement in this number and manner provided for the convenience of link spacing and symmetry in the assembly of the entire flexible belt. Once again fasteners, as illustrated occasionally at 15, attach the links to their respective connectors proximate each end, and in a manner that provides for lapping between the integral end extension from each link with respect to the end extension from the next adjacent link. Hence, tangency can be maintained, and stress points alleviated, at the vicinity where a fastener 15 holds a link to a connector, even as the flexible belt is being moved around the curvature of a drum. It might be commented that one or more of the links may be provided with a central aperture, as of 79, and as previously described, for accommodating the dowel pins 33 of a driving drum, such as the identified drum 1.

Figure 17:
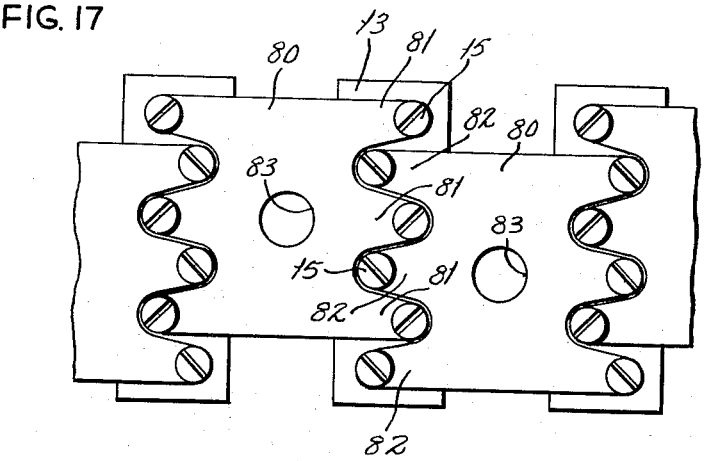
FIG. 17 is a view similar to FIG. 1 showing another form of the invention.

FIG. 17 discloses a further modification in the type of links that may be used to form a flexible belt, and the offset links 80 as wherein shown are comprising having a plurality of extensions 81 from each end, extending generally less than the width of a connector, with extensions 81 from one link interdigitating and lapping the extensions from the end of the next adjacent link, and with the fasteners 15 providing the means for securing these link ends to the connector. Once again, it should be noted that the fasteners 15 secure the link ends 81 to the connector 13 at a location where the similar link ends 82 lap said ends 81, the fastening of one series of ends being beyond the fastening of the next adjacent series of ends, so as to advantageously employ the principle of this invention of sustaining stress free fastening of the links to a connector even during the curved motion of the flexible belt around a drive or idler drum. The apertures 83 are provided for accommodating the dowel pins 33 of the drum.

FIG. 18 discloses a variation of the style of link for the flexible belt, with one link 84 formed having a pair of extensions 85 from each end, with the next adjacent alternate link 86 having a single integral extension 87 from each end. The pair of extensions 85 from one link is designed to accommodate, embrace and lap the single extension 87 from the next adjacent link, with said extensions being secured by means of the fasteners 15 to the connector 13 in a position where said link ends lap one another in the direction of the belt length. The link ends 85 are shown secured by the fasteners 15 in a position beyond where similar fasteners secure the extension 87 to the shown connector.

FIG. 19 discloses yet another modification in the application of this invention, being somewhat similar in structure to the flexible belt defined and shown in FIG. 17, wherein adjacent links 88, each having a plurality of extension 89 and 90 and which interdigitate with one another, and lap one another, being secured to a connector 13 by means of the fasteners as at 15. The ends 89 lap the ends 90 and are secured by means of the fasteners 15 at a position where they are spaced lengthwise beyond the region where the ends 90 are secured to the same connector.

FIG. 20 is similar to the view of the invention shown in FIG. 13, with the exception that the flexible belt of this modification is made of one continuous strip of flexible material, having adjacent ends in the manner of formation of the belt shown in FIG. 12. Each proximate end of this belt 91 is formed having a singular extension, approximately of half the width of the belt and extending approximately the width of the connector, as 92 and 93, with said extensions lapping one another in the direction of the belt length, and being secured to its connector by means of the fasteners 15. One fastener 15 secures its extension to the connector at a position beyond where the associated extension is secured by its respective fastener 15, yet being within the region where the extensions 92 and 93 each lap one another.

Figure 21:
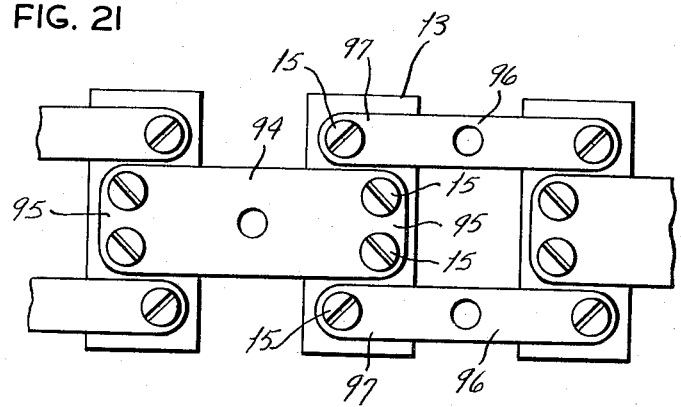
FIG. 21 is a view similar to FIG. 1 showing another form of the invention.

FIG. 21 is similar to the principle of the invention previously described in FIGS. 15 and 16, wherein a single link 94, having a unitary extension 95 integrally formed at each end, is attached by means of the fasteners 15 to a connector 13. Likewise, a pair of flexible members 96, forming the next adjacent link along the length of the belt, has an extension 97 integrally formed at each end and is likewise secured to the connector 13 by means of the fasteners 15, and at a position where said pairs of links 96 lap the fastened extension 95 of the embraced link 94.

Figure 22:
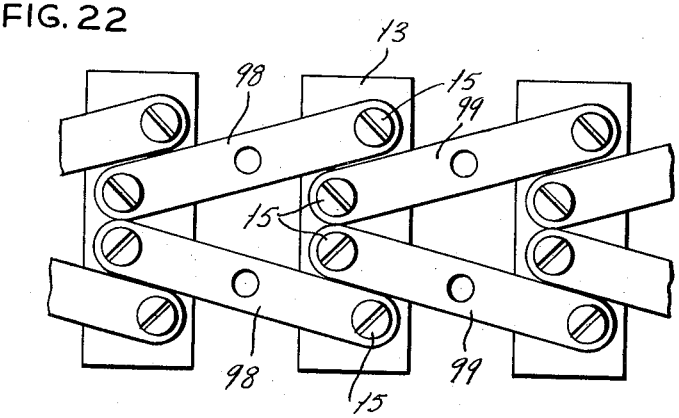
FIG. 22 is a view similar to FIG. 1 showing another form of the invention.

FIG. 22 shows yet another variation in the use of the principle of this invention, wherein a series of pairs of links 98 are arranged proximate at one end, while being spread at their opposite ends for lapping the confined ends of the next adjacent pair of links 99 that secure by means of the fasteners 15 to a connector 13. It is to be noted that the fasteners 15 securing the extending ends of the pair of links 98 are arranged at a position beyond where the fasteners 15 secure the confined ends of the next adjacent pair of links 99, with said fasteners being made in a position where the pairs of links are arranged in lapping relationship.

Figure 23:
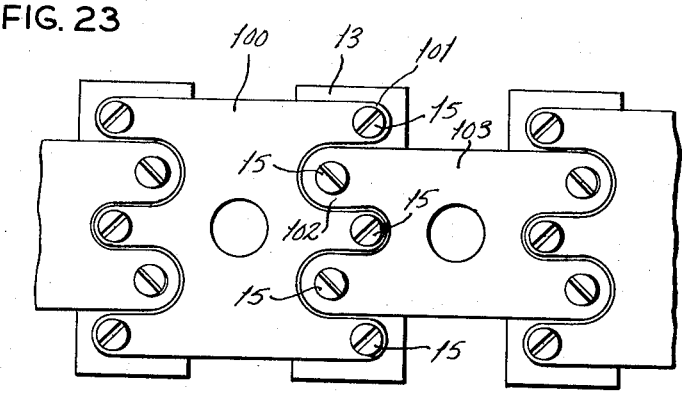
FIG. 23 is a view similar to FIG. 1 showing another form of the invention.

Finally a further modification in the arrangement of the flexible belt of this invention is shown in FIG. 23, wherein each link 100 is formed having a series of extensions, as at 101, from its ends, to provide for an interdigitation or lapping of the extension 102 of the next adjacent link 103. The fasteners 15 once again secure the ends of one link to a connector 13 at a position slightly beyond where similar fasteners secure the extending ends from the next adjacent link, and at a location where said extensions lap one another.

It will be seen that in all forms of the invention the belt parts with the exception of the connectors are ribbon-like and that their forms can be conveniently made by shearing or the like. It will also be apparent that weldments may be substituted for the screw fasteners 15 and that the follower rollers 55 and 57 may be omitted and nonrotary finger followers used. Holes such as 35 and pins such as 33 may be employed or omitted from any form of the invention. Also, other appropriate numbers of lapping fingers and tongues such as 9 and 11 may be employed.

In conclusion, certain of the basic features of the invention are presented in exaggerated form in the skeleton diagram of FIG. 14. This shows a drum such as 1 or the like on which are wrapped adjacent portions such as M and N of flexible belt-forming material having lapped extensions 5 and 7, the outer ends 9 and 11 of which are maintained in a common plane P—P by a rigid connector 13 attached thereto at fasteners 15 and spaced apart the distance D. From this FIG. 15 it is clear that the connector 13 is normally resiliently held in the position shown and that the material at locations of fasteners 15 is free of any bending. Under conditions of light weight of connectors 13 and their loads, the tangent point O normally takes up a position bisecting D but, as the connector oscillates somewhat, this point O may deviate some from the bisecting position without arriving closely enough near either of the points of fastening 15 to result in any substantial bending stresses thereat. Under conditions of heavier weight of connectors 13 and their loads, (as in FIGS. 8–10) the guides such as 63 and 67 prevent excessive oscillations so that the position of O bisecting D is positively maintained.

In the link form of the invention (FIG. 1) in which the belt is composed preferably of a number of precision die blanded links (holes included in the blanking) it is important that the belt shall remain straight in the reaches between drums, which is to say that it shall not assume a camber transverse to the belt center line C—C. Such a chamber may occur if the blanked pairs of holes in the links 3 and/or if jig-drilled holes in the connectors 13 are not exactly collinear on the perpendicularly transverse lines 17 and 19, as may occur even with precision blanking and jigging. Any resulting small repetitive errors in blanking and jig drilling become cumulative on one side or the other of the belt to bring about said camber. Upon assembly, this is avoided by turning over every other one of commonly blanked links 3 oppositely with respect to the center line C—C. Likewise any contribution to camber occurring because of repetitive jig drilling errors in the connectors 13, upon assembly, is corrected by turning over every other connector oppositely with respect to the center line C—C. To this end opposite faces of all connectors 13 are made plane and parallel as shown in FIGS. 1 and 2 so that in either position they present like inner faces contacting the links and like outer faces for fastening workpieces thereto.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A flexible belt for use in a carrier mechanism and comprising at least one pair of adjacent substantially flat flexible portions and a connector for retaining said portions together, at least one extension from each of said flat flexible portions, said extensions projecting oppositely to one another in belt length direction of the belt length and substantially in the plane of the belt when straight, each extension having an outer end, at least said ends of the extensions transversely lapping one another in the direction of the belt length and thereby forming a space between said lapping extension ends, at least one rigid connector spanning said space, rigid fastening means attaching said connector to the proximate ends of the extensions respectively, the location of the fastening means securing one extension end to the connector being in the region where said extensions lap one another in the direction of the belts length and being spaced lengthwise beyond the location where another fastening means secures said other extension end to the connector, whereby in an arcuate form of the belt said connector will maintain said ends substantially in a plane outside of the arcuate form, thereby to avoid bending of the ends at said fastenings.

2. The flexible belt of claim 1 wherein there are a series of extensions from each of said flat flexible portions.

3. A flexible belt comprising at least one pair of adjacent substantially flat flexible portions and a connector for retaining said portions together, at least one extension from each of said flat flexible portions, said extensions projecting oppositely and lapping one another in the direction of the belt length, at least one rigid connector being held to said lapped extensions, a fastening means holding said connector to one extension, and another fastening means holding said connector to the other extension at a location where said second extension laps said first extension and spaced lengthwise beyond the attachment of said connector to said first extension along the length of the belt, whereby in an arcuate form of the belt said connector will maintain said extensions substantially in a plane outside of said arcuate form, thereby to avoid bending of the extensions proximate the location of their fastening to said connector.

4. The flexible belt of claim 3 wherein one extension comprises a tongue like extension, the other extension comprising a pair of finger like extensions, said finger like extension embracing and lapping a portion of said tongue like extensions.

5. A flexible belt according to claim 3 wherein each of said adjacent flexible portions and each extension therefrom including its end are integral and composed of a single flat sheet and wherein the spanning connector has coplanar face portions at said fastening means.

6. The belt according to claim 5, wherein said adjacent flexible portions are also integral and form a part of an endless strip.

7. A belt according to claim 5, wherein said adjacent flexible portions are separate and with their respective extensions form ends of a continuous strip.

8. A belt according to claim 5, wherein there are several connectors and several pairs of said adjacent flexible portions and their respective extensions, the extension of the members of each pair being joined by a connector, whereby the belt is composed of flexible links.

9. A flexible belt comprising, a series of adjacent links, each link having an end, each link having at least one extension each end, each extension having an end, the extensions on adjacent links projecting oppositely in the plane of the belt when the belt is straight and lapping one another in the direction of the belt length to form a longitudinal distance between said extension ends in the direction of the belt length, each link, including its extensions and their ends being flexible, integral, and normally substantially flat, a rigid connector spanning each space, rigid fastening means attaching each connector and the ends of a pair of the lapped extensions, one fastening means holding said connector to one extension end, and another fastening means holding said connector to the other extension end at a location where said second extension laps said first extension and spaced lengthwise beyond the attachment of said connector to said first extension along the length of the belt, whereby said connector will maintain said ends substantially in a plane outside of and tangent to said belt when it is in an arcuate configuration, thereby to avoid bending of the extension ends at said rigid fastening means.

10. A flexible belt comprising, a series of adjacent links, each link having an end, each link having at least one extension from each end, each extension having an end, there being two extensions of finger-like form projecting from one end of each link and a single extension of tonguelike form from the other end of each link, the extensions on adjacent links projecting oppositely in the plane of the belt when the belt is straight and lapping one another in the direction of the belt length to form a longitudinal distance between said extension ends in the direction of the belt length, whereby the single tongue-like extension from each link lies between the two finger-like extensions from an adjacent link, each link, including its extensions and their ends being flexible, integral and normally substantially flat, a rigid connector spanning the distance between the lapping extension ends, there being one rigid fastening means between the connector and each finger-like extension, and at least one fastening means between the connector and each tongue-like extension at a location where said tongue-like extension laps said finger-like extensions and spaced lengthwise beyond the attachment of said connector to said finger-like extensions along the length of the belt, whereby in an arcuate form of said belt said connector maintains said extensions substantially in a plane outside of the arcuate configuration, thereby to avoid bending of the extension ends at said rigid fastening means.

11. A flexible belt comprising a continuous substantially flat flexible portion, at least one pair of extensions projecting from said portion, said extensions projecting substantially opposite and lapping one another in the direction of the belt length, at least one rigid connector being held to said lapping extensions, a fastening means holding said connector to one extension, and another fastening means holding said connector to the other extension at a location where said second extension laps said first extension and spaced lengthwise beyond the attachment of said connector to said first extension along the length of said belt, whereby in an arcuate form of said belt said connector maintains said extensions substantially in a plane outside of the arcuate form, thereby to avoid bending of the extensions proximate the location of their fastening to said connector.

12. The invention of claim 11 wherein said first fastening means attaches the end of said first extension proximate the side edge of the connector, and the other fastening means attaches the distant end of the other extension proximate the other side edge of said connector.

13. In a flexible belt at least one junction between adjacent separate portions of flexible material comprising, projections formed from the flexible material of said separate portions respectively and projecting therefrom in lapping relationship with one another along the length of the belt, a rigid connecting member, fastening means attaching the end portions of the projections and said connecting member, one of said fastening means holding said connector to one projection, and another of said fastening means holding said connector to the other projection at a location where said second projection laps said first projection and spaced lengthwise beyond the attachment of said connector to said first projection along the length of the belt, whereby in an arcuate form of the belt said connecting member will maintain said projections substantially in a plane outside of and substantially tangent to said arcuate form, thereby to avoid bending of the projections proximate the location of their fastening to said connector.

14. A flexible belt comprising at least one pair of adjacent portions, at least one extension from each portion, said extension from the first portion projecting opposite the extension from the other portion so as to obtain lapping of said extensions in the direction of the belt length, a connector, fastening means securing said connector to each extension, the location where one fastening means securing the first extension to the connector being at a location in the area of lapping and spaced beyond the location where another fastening means secures the other extension to said connector, whereby in an arcuate form of the belt said connector maintains said extensions substantially in a plane outside of and tangent to said arcuate form, thereby to avoid bending of the extensions proximate the location of their fastening to said connector.

15. The invention of claim 14 wherein the first extension projects beyond the second extension in a direction of the belt length, with said extensions being substantially maintained in the plane of the belt.

16. A flexible belt comprising a substantially flat flexible belt portion, at least one pair of extensions projecting leftward and rightward from said protion, said extensions projecting substantially opposite to each other and lapping one another in the direction of the belt length, a rigid connector being held to said lapping extensions, said connector having left and right side edges, a fastening means securing said rightward projecting extension to the connector proximate its right side edge, and another fastening means securing said leftward projecting extension to said connector proximate its left side edge, the location of the fastening of said extensions to said connector being in lapping relationship, whereby in an arcuate form of said belt said connector maintains said extensions substantially in a plane outside of and substantially tangent to said arcuate form, thereby to avoid bending of the extensions proximate the location of their fastening to said connector.

* * * * *

UNITED STATES PATENT OFFICE
CERTIFICATE OF CORRECTION

Patent No. 3,870,142         Dated March 11, 1975

Inventor(s) Duane W. Woltjen

It is certified that error appears in the above-identified patent and that said Letters Patent are hereby corrected as shown below:

Claim 16, Column 12, Line 42, change "protion" to --- portion ---.

Signed and Sealed this sixteenth Day of September 1975

[SEAL]

Attest:

RUTH C. MASON
*Attesting Officer*

C. MARSHALL DANN
*Commissioner of Patents and Trademarks*